(12) United States Patent
Camerlo et al.

(10) Patent No.: US 7,574,687 B1
(45) Date of Patent: Aug. 11, 2009

(54) METHOD AND SYSTEM TO OPTIMIZE TIMING MARGIN IN A SYSTEM IN PACKAGE MODULE

(75) Inventors: Sergio Camerlo, Cupertino, CA (US); Wheling Cheng, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 11/325,027

(22) Filed: Jan. 3, 2006

(51) Int. Cl.
*G06F 17/50* (2006.01)
(52) U.S. Cl. ................................. 716/16; 716/6; 716/13
(58) Field of Classification Search ...................... 716/6, 716/13, 16
See application file for complete search history.

(56) References Cited
U.S. PATENT DOCUMENTS 4,942,373 A * 7/1990 Ozawa et al. ............... 333/161
6,446,249 B1 * 9/2002 Wang et al. ................... 716/17
7,450,535 B2 * 11/2008 Best ............................. 370/314

OTHER PUBLICATIONS

Lawrence Golick, et al, "EETimes.com—SiP Models call for right blend of tech" 2 pages, May, 10, 2004.
Manoz Krovvidy, et al "DDR Timing Closure: Physical Design and STA Methodology", 31 pages. 2003, Snug, Boston.

* cited by examiner

*Primary Examiner*—Jack Chiang
*Assistant Examiner*—Brandon W Bowers
(74) *Attorney, Agent, or Firm*—Trellis IP Law Group, PC

(57) ABSTRACT

In a System-in-Package (SiP) module, a method and a system for optimizing the timing margin of source-synchronous interface clocks is provided. Clock signals generated by first device are transmitted to serpentine traces located on a Printed Circuit Board (PCB) which adjusts the active edge of one signal relative to another signal. The serpentine trace introduces a delay in the clock signal thereby optimizing timing margins. By providing access to signals otherwise internal the SiP, testing and signal verification is also simplified.

5 Claims, 3 Drawing Sheets

METHOD AND SYSTEM TO OPTIMIZE TIMING MARGIN IN A SYSTEM IN PACKAGE MODULE

BACKGROUND OF THE INVENTION

1. Field of Invention

Embodiments of the invention relate in general to improved electronic packaging. More specifically, the embodiments of the invention relate to a System-in-Package module having adjustable delay lines for improved timing margin.

2. Description of the Background Art

The System-in-Package (SiP) concept combines one or more electronic requirements of a fully functional system or subsystem in one electronic package. The package forms a functional block or module that can be used as a standard component in circuit board level manufacturing. SiP modules enable high-density circuit board layouts by combining one or more integrated circuit (IC) devices, on the same package substrate. This results in considerable savings in the area of circuit boards that would otherwise be dedicated to routing traces between separate packages. It also reduces power consumption because shorter un-terminated wirings (transmission lines) do not need to be terminated.

However, one problem with mounting IC devices in a SiP module arises because the setup and hold times are violated when a synchronous clock signal path is shorter than the original design specification. This may occur because the original design guidelines of the IC devices assumed each of the chips would be packaged in separate packages which necessarily results in a rather long trace from the clock source to devices that use the clock.

To illustrate, consider a SiP module having two IC devices, one of which is a Fast Cycle Random Access Memory (FCRAM) and the other of which is an Application Specific Integrated Circuit (ASIC), having control circuitry including a synchronous clock signal that controls the operation of the FCRAM. If each of these IC devices were originally designed to be mounted on a circuit board, then mounting them on the SiP module will cause setup and hold time violations due to the decrease in spacing and the trace lengths between the IC devices. For example in a typical circuit board where each IC device is separately packaged, a clock line may belong than the trace of the data lines to ensure that the clock signal arrives a few nanoseconds after a data transition. To achieve the delay, it is common practice to layout the circuit board with a longer clock trace which is typically in a serpentine pattern. Thus, the delay time for the clock signal is dependent on the relative length of clock trace relative to the length of the data traces. To illustrate, a serpentine clock trace of about 6 inches is required to implement a half-bit delay at a clock rate of about 250 MHz.

Unfortunately, in the SiP module, routing space for implementing serpentine traces is simply not available. Therefore, in the traditional approach to adapt SiP modules to accept existing IC devices, clock delays must be implemented with thin-film delay lines. Unfortunately, SiP modules with the thin-film delay lines must be custom designed and manufactured for each specific IC chip which is very expensive and requires a long lead time for such custom packages to be built. One will appreciate that custom packages also complicate the manufacturing process because of procuring and stocking requirements. Further, the use of internal delay lines increases the size of the SiP module thereby limiting the advantages of moving IC devices from individual packages to the SiP module. Further still, if the module is to operate at a different clock rate, then a new module must be provided with the appropriate delay lines.

Alternatively, compensation for the shorter transmission delay in the SiP module can be accomplished with a re-spin of the ASIC to add the delay internal to the IC chip. However, this alternative is clearly undesirable due to the cost and time required to redesign the chip layout.

DETAILED DESCRIPTION OF EMBODIMENTS OF THE INVENTION

Embodiments of the invention provide methods and systems for optimizing the timing margin of integrated circuit (IC) devices in System-in-package (SiP) modules. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Optimization of timing margins often requires the introduction of some delay in synchronous clock signals. This delay is used to adjust the setup and hold time of the clocks relative to the data. The present invention provides an electronic SiP module system that optimizes timing margins by routing clock signals from the SiP module to external-traces on a printed circuit board (PCB). Signal delay is introduced outside the SiP module and the appropriately delayed signal is then brought back into the SiP module and communicated back to the other IC device within the SiP module.

Figure 1:
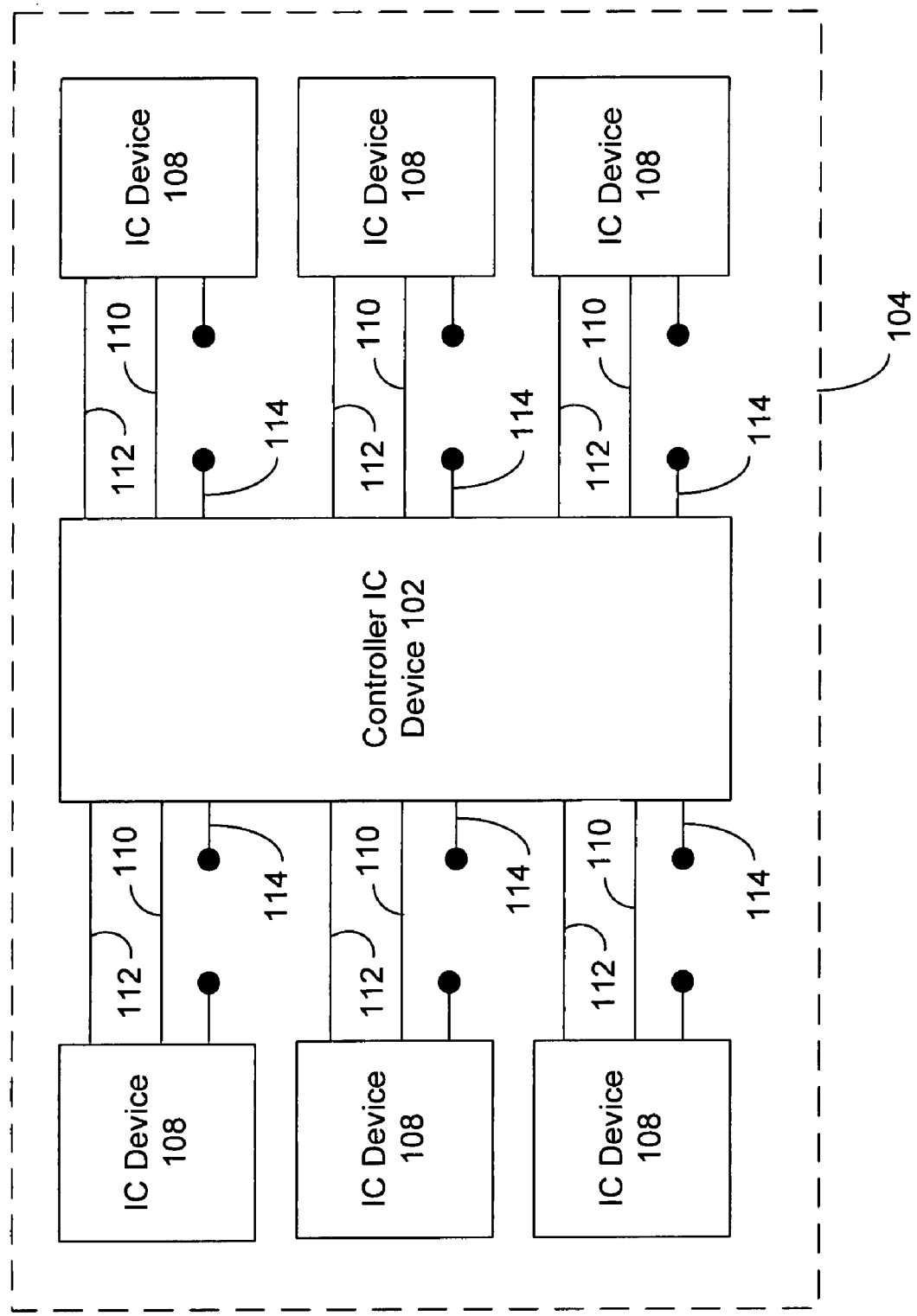
FIG. 1 illustrates a schematic view of a system in a package (SiP) module layout of in accordance with an embodiment of the present invention.

Referring now to FIG. 1, where a top schematic view of a system in a package (SiP) module layout is shown in accordance with an embodiment of the present invention. Controller IC device 102, which may be an ASIC device or an integrated circuit (IC) device designed to provide a desired functionality, is shown mounted on a System-in-Package (SiP) module 104. Preferably, controller IC device 102 is a bare die mounted on the SiP substrate but it will be appreciated that the device may be encapsulated in other embodiments. To illustrate the present embodiment further, controller IC device 102 may be a memory controller, a route processor or other application specific device. In this embodiment, controller IC device 102 is shown mounted in a central location and is surrounded by a plurality of other IC devices 108 that are also mounted on SiP module 104 closely proximate to controller IC device 102. In this embodiment, each of the plurality of IC devices 108 are preferably Fast Cycle Random Access Memory (FCRAM) devices that require a synchronous clock signal delayed by at least one-half of a bit. It is to be understood that in other embodiments, IC devices may provide different functionality. As with controller IC device 102, IC devices 108 may be either a bare die mounted on the SiP substrate or encapsulated before mounting on Sip substrate.

Controller IC device 102 is electrically coupled to each of the plurality of IC devices 108 by address bus 110, control bus 112 and by at least one clock signal trace 114.

In the embodiment shown in FIG. 1, controller IC device 102 generates a synchronous clock signal 114 that is used to clock data into each of the IC devices 108. Because of the close proximity of the IC devices mounted on SiP module 104 and the trace routing density, it is difficult to delay a clock signal by providing long serpentine traces to each of the IC devices 108 on the mounting surface of the SiP module 104 if the size of the SiP module 104 is to be minimized. Thus, while buses 110 and 112 may be routed directly between devices 102 and 108, routing a serpentine clock trace is difficult due to lack of space and other routing restrictions. Further, it will be apparent to one skilled in the art that an appropriate amount of delay, often referred to as the setup time, is necessary to ensure that the data is valid when the clock signal arrives at each IC device 108 and if this delay is not compensated for in the IC device, it must be externally provided. Accordingly, in accordance with the present invention, an external loop is provided in the SiP module that routes the clocks, as well as other signals that may be required for testing the functional parameters of the SiP module.

Figure 2:
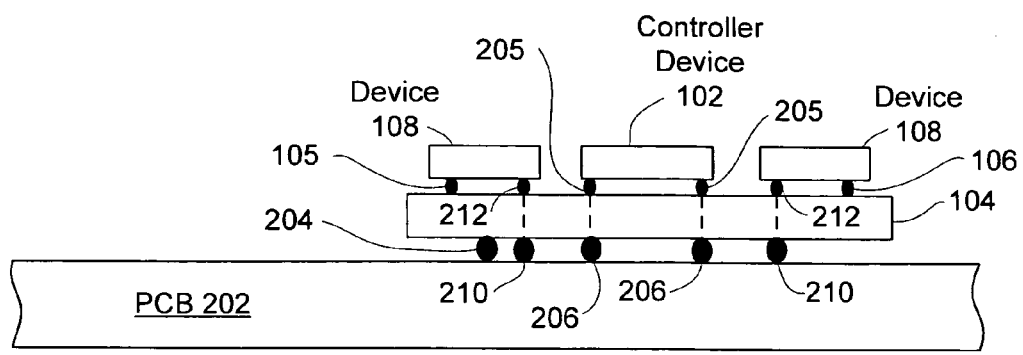
FIG. 2 shows a partial side view of a SiP module mounted on a printed circuit board (PCB) in accordance with an exemplary embodiment of the present invention.

Refer now to FIG. 2 where a cross-sectional view of SiP module 104 is shown. Here, IC devices 102 and 108 are shown to be electrically and mechanically connected to SiP module 104 by solder bumps 106 or other surface mounting techniques. The SiP module 104 further provides external electrical connections to a printed circuit board (PCB) 202 that, in one embodiment, are achieved by a plurality of connectors 204. It will be appreciated that connectors 204 may be of any connector type such as a pin grid array, lead-frame, ball grid array (BGA) or other high-density connector technology. In one preferred embodiment, connectors 204 are in the form of a BGA.

Figure 3:
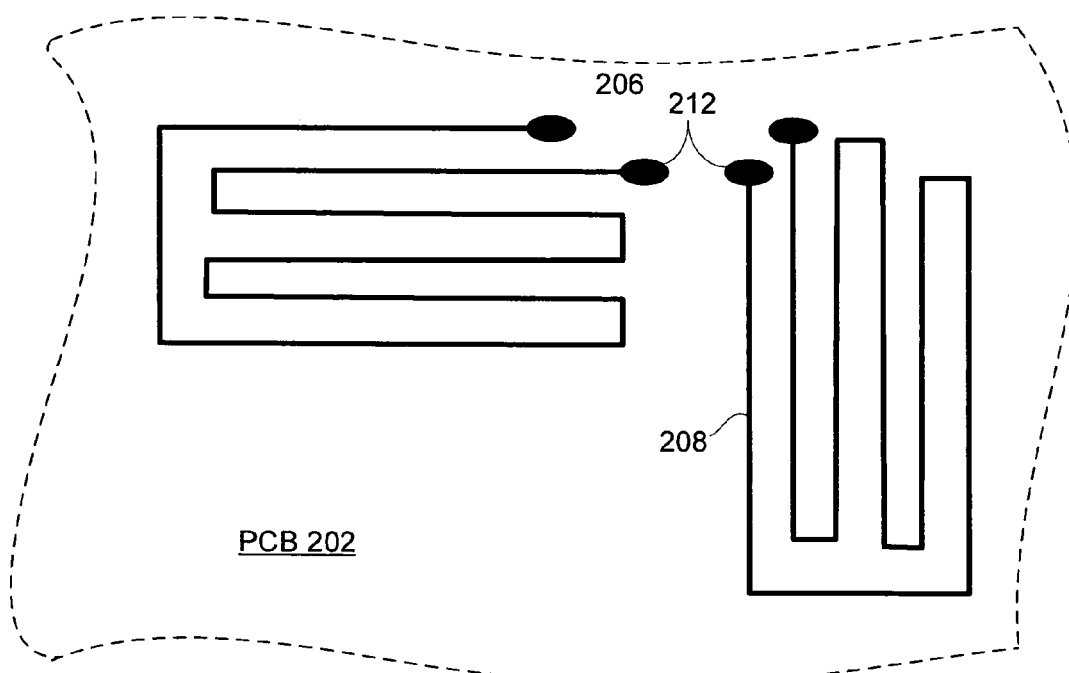
FIG. 3 is a plan view of the printed circuit board showing an embodiment of the serpentine delay line in accordance with the present invention.

A serpentine trace 208 is implemented on a conductor layer of PCB 202 where routing real estate is more readily available and is illustrated in FIG. 3. Preferably, there is one such serpentine trace 208 for each clock signal routed to device 108. The length of the serpentine trace 208 is sufficient to introduce the appropriate delay to the clock signal for a particular application and may be tuned during manufacturing by altering the length of the trace. For example, trace 208 may include fuse-able links or other techniques that can either shorten or lengthen trace 208 as required by a particular application. In order to couple the clock signal from the controller device 102 to the serpentine trace 208, the plurality of connectors 204 includes connectors 206 that are used to route the clock signal off of the SiP module and onto the PCB 202 as represented by the dotted lines between connectors 206 and solder bumps 205. Each clock trace 114 is thus routed from the controller IC device 102 to one of the plurality of connectors 204, such as ball connector 206 and then onto the PCB 202. Serpentine trace 208 terminates at a return connector 210 and then routed to the appropriate IC device 108 on the SiP module 104 through solder bumps 212. Although only two serpentine traces 208 are illustrated in FIG. 3, it will be appreciated that a serpentine trace is preferably provided for each clock signal such that a customized delay is easily introduced to the completed system.

Accordingly, in accordance with the present invention, each clock signal is routed to two connectors to introduce trace delay outside of the SiP module. The, signal trace delay can be adjusted during electrical testing of the final assembly, during characterization, or on PCB 202 in the final product application. Advantageously, the present invention satisfies timing equations by adding any necessary timing delay outside of the SiP module and enables timing optimization to improved yield in high-volume manufacturing environments. A significant additional advantage is provided by bringing the clock signal and other control or reference signals out of the SiP to provide accessibility and testability of the SiP module.

Density, in terms of a much smaller SiP module is achieved by improved utilization of the substrate routing area. Performance, in terms of improved timing granularity is also achieved when the actual clock/data or clock/control relationship is known and controllable.

The improved control and monitoring of the timing relationships during the test phase enables improved characterization of the interface between IC devices and can be used to optimize or adjust the timing relationships to safely run at a higher or lower clock rates.

Advantageously, the avoidance of custom-made delay lines on, for example, each of a plurality of clock traces (which in one SiP module embodiment, could easily number about 50 such clock signals) reduces the cost per SiP module of a least one dollar per clock trace. A further advantage of the present invention minimizes SiP module dimensions thereby generating substantial savings in terms of the SiP module's substrate cost, reduced size of the PCB and lower power dissipation. While the additional connectors 206 and 210, which can approach an additional 100 connectors (for a SiP module with 50 clock signals) will introduce additional cost, the cost per connector is substantially less than the cost savings. In one embodiment, it is believed that the cost per additional connector is less than about a nickel and does not change the SiP Module size therefore these additional features can be added at minimal cost.

Figure 4:
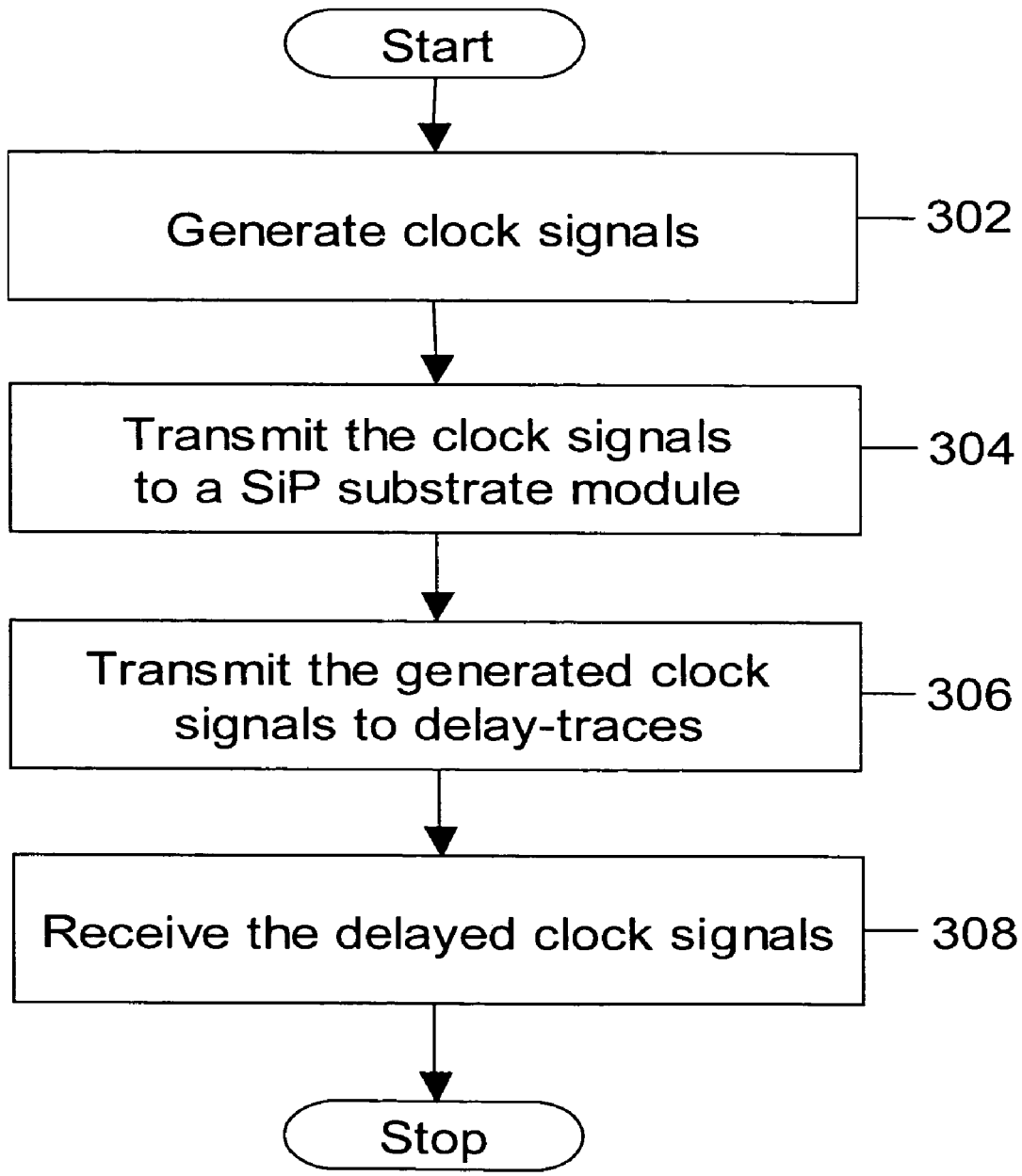
FIG. 4 is a flow diagram depicting the routing of clock signals through a SiP module substrate and an external-host PCB, in accordance with an exemplary embodiment of the present invention.

FIG. 4 is a flowchart depicting one method for optimizing the timing margins of an illustrative embodiment having a plurality of source synchronous interface clocks. At step 302, the source synchronous clocks generate clock signals. At step 304, the generated clock signals are transmitted to SiP module 104. At step 306, each of the generated clock signals are transmitted to a corresponding external trace that introduce an appropriate delay. At step 308, the delayed clock signals are received by SiP module and routed to the other IC device.

In another embodiment of the invention, a method for optimizing the timing margins of source-synchronous interface clocks has been provided, whereby the clock signals are transmitted to SiP module substrate through the connectors. The method comprises: generating clock signals; communicating the generated clock signals from a System-in-Package (SiP) module substrate to an external Printed Circuit Board (PCB); transmitting the clock signals to delay-traces to delay the clock signals, the delay-traces being present on an external PCB, Various embodiments of the invention provide a method for optimizing the integrity of clock signals In yet another embodiment of the invention, a system for optimizing the timing margins of interface clocks is provided. The system comprises: means for generating clock signals; means for communicating the generated clock signals to a System-in-Package (SiP) module substrate; means for transmitting the generated clock signals to delay-traces, the delay-traces delaying the clock signals, the delay-traces being present on an external PCB; and means for receiving the delayed clock signals from the delay-traces, the delayed clock signals being received by the SiP module substrate and routed to other IC devices on the SiP module such that the setup and hold times of data and control signals, relative to the clock signal are maintained for at least one clock rate.

In still another embodiment of the invention, a system for optimizing the timing margins of a clock signal is provided. The system comprises: a System-in-Package (SiP) module substrate electrically and mechanically coupled to an IC device, the SiP module receiving the clock signals generated by the IC device; a PCB electrically and mechanically coupled to the SiP module substrate, the PCB comprising delay-traces, the delay-traces introducing a delay in the clock signals; a plurality of IC devices electrically and mechanically attached to the SiP module substrate, the plurality of elements receiving the delayed clock signals.

Various embodiments of the present invention provide a much smaller module for better area utilization and improved the timing granularity. The present invention provides improved control and monitoring of timing signals during the test phase on Automated Test Equipment (ATE) and the field deployment.

Although the invention has been discussed with respect to specific embodiments thereof, these embodiments are merely illustrative, and not restrictive, of the invention. For example, a "SiP module substrate" can include a Multichip Module (MCM).

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise."

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Embodiments of the invention may be implemented by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

What is claimed is:

1. A method for optimizing timing margin of a clock in a System-in-Package (SiP) module, the method comprising:
   generating timing dependent signal from a controller circuit device mounted on a SiP module;
   transmitting the timing dependent signal to a serpentine trace on a Printed Circuit Board (PCB) to delay the timing dependent signal; and
   transmitting the delayed timing dependent signal to a controlled circuit device mounted on the SiP module.

2. The method of claim 1 further comprises transmitting the timing dependent signal from the SiP module through a first connector to the serpentine trace.

3. The method of claim 2 further comprises transmitting the timing dependent signal from the serpentine trace through a second connector to the SiP module.

4. The method of claim 1, wherein the delay in the timing dependent signal is about a half-bit time-delay.

5. The method of claim 1, wherein the delayed timing dependent signal is transmitted to at least one circuit device electrically and mechanically connected to the SiP module.

* * * * *